(No Model.)
H. B. LYTLE.
APPARATUS FOR THREADING WIRE THROUGH TUBES.
No. 273,295. Patented Mar. 6, 1883.
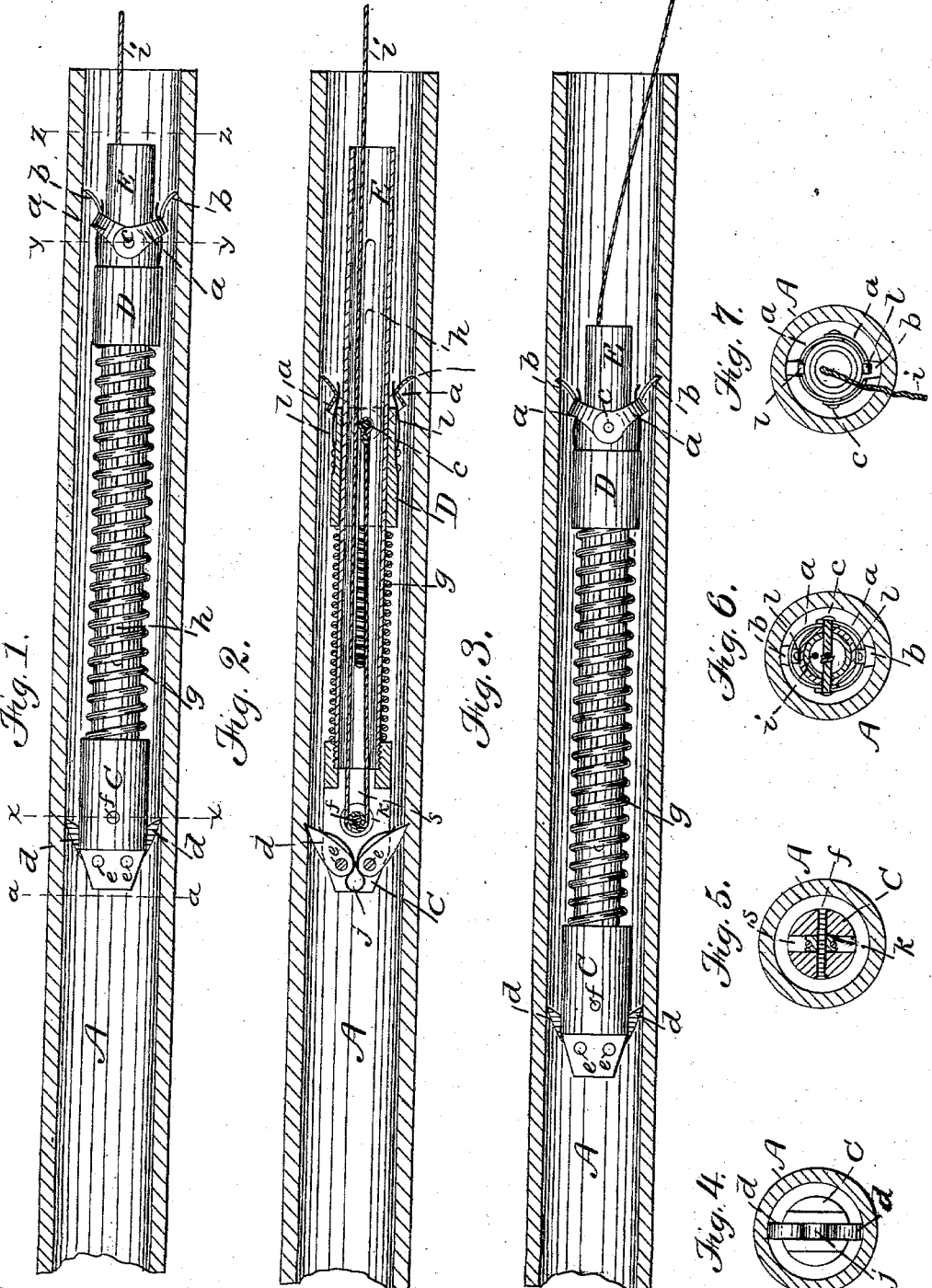
Witnesses.
Geo. Willis Pierce
J. H. Cheever.
Inventor
Henry B Lytle

UNITED STATES PATENT OFFICE.

HENRY B. LYTLE, OF BOSTON, MASSACHUSETTS, ASSIGNOR TO THE AMERICAN ELECTRICAL WORKS, OF PROVIDENCE, R. I.

APPARATUS FOR THREADING WIRES THROUGH TUBES.

SPECIFICATION forming part of Letters Patent No. 273,295, dated March 6, 1883.

Application filed November 20, 1882. (No model.)

*To all whom it may concern:*

Be it known that I, HENRY B. LYTLE, of Boston, in the county of Suffolk and State of Massachusetts, have invented certain Improvements in Apparatus for Threading Wire Through Pipes, of which the following is a specification.

My invention relates to a method and apparatus for drawing ropes, cords, or wires through long pipes or tubes, and is particularly adapted for use in connection with the protective tubing of electrical cables and conductors, or in systems of subterranean pipes for electrical conducting-wires. Its object is to provide a cheap and convenient but thoroughly efficient means for effecting the passage of the wires through long sections of tubing, for facilitating the manufacture of electrical cables or single wires when protected by an envelope of leaden tubing, and for drawing cords or strings through pipes or tubes of any character and for any purpose whatsoever; and to this end my invention consists in a hollow rod slotted longitudinally and provided at one end with a pair of spring-clutches, a sleeve sliding longitudinally thereon and normally maintained at that end of the rod which is unprovided with the clutches by a stiff spiral spring. The sleeve is also provided with clutches or pawls, and is fastened to one end of a cord which extends through the hollow rod, passes round a pulley, and returns to the end at which the sliding sleeve is normally located, from whence it issues, and may be of any desired length, the entire apparatus being an instrument which, placed within a tube to which its clutches are in size adapted, will, when the cord is pulled and the spring thereby compressed, advance by successive leaps through the tube, each pull of the cord resulting in a corresponding advance of the instrument, which thus progresses from one end of the said tube to the other. It is obvious that a second cord may be fastened to the permanently-attached cord of the instrument, and a wire or wires, as may be required, thus drawn through, irrespective of the length of the tube.

In preparing lead-covered cables it has heretofore been customary to insert first into the leaden tube the end of an iron wire, or of a cord having an iron preceding piece, and to draw the same through by the attraction of a strong magnet, which for that purpose has been drawn along the outside of the tube. This method has certain disadvantages, among which are the facts that the magnet frequently loses its hold upon the iron inside the tube, necessitating repetitions of labor, and also that when this method is employed an iron tube cannot be used, as it would serve as a screen and keep the magnetism from exerting any power upon the work to be done. Wires have also been drawn through long tubes by attaching an approximately air-tight traveler to a cord, inserting it in the tube, and causing it to travel through by pneumatic pressure, either by exhausting the air in front of it or compressing the air in its rear, while another plan is to arrange in a system of underground telegraphy a conduit for the reception of the wires, having two compartments, united longitudinally by a slit extending between them throughout the entire length of the conduit. A motor travels in the upper compartment, and by means of the slit draws behind it a trailing cord connected with a cable in the lower. My invention, however, unlike the above, does not render necessary expensive and complicated apparatus; neither does it necessitate peculiar construction, as in the latter case; but it is inexpensive in itself, is easily manipulated, and can be readily applied to any system of tubing or conduits, whether composed of lead, iron, or other metal, or of unglazed earthenware.

In the drawings which accompany and form a part of this specification, Figure 1 shows a section of tubing with the traveling instrument just inserted therein, and before any force is exerted thereon. Fig. 2 is a section through both tube and traveler, showing the position of the latter with its spring compressed and hinder claws or clutches advanced, while the force is being applied as a pull upon the cord. Fig. 3 shows the position of the traveler assumed in the tube upon the release of the cord. Fig. 4 is a section on the line *a a* of Fig. 1, showing an end view of the head C of the traveler and its clutches *d d*. Fig. 5 is a section on the line *x x*, Fig. 6 on the line *y y*, and Fig. 7 on the line *z z*, of Fig. 1.

The material I have employed in the construction of the traveling instrument has been brass, although any other hard metal or alloy in common use may be equally well applied thereto.

A metal tube, E, of any desired length, and of an outside diameter to be determined by the diameter of the tube to be operated upon, has rigidly affixed to one end thereof a head, C, of the same material, which is mortised or slotted out, as shown at s in the longitudinal section, Fig. 2, and in cross-section at Fig. 5. A metal sleeve, D, slides loosely upon the tube or tubular rod, and is maintained thereon by devices which are hereinafter described. It is also maintained normally at or near that end of the tube E which is opposite to the head C by means of a stiff helical spring, g, which presses against the shoulder of both the head C and the sleeve D. Passing through the slot or mortise s in the head C and the metal jaws forming the sides of the said slot is a pin, f, on which runs a small pulley, k; and nearer to the point, and also passing through the sides and space of the same slot, are two other pins, e e, on each of which is loosely pivoted a pawl or clutch, d, the points of the pawls d being uniformly extended outward, and so maintained by a flat spring or springs, j, fixed between them, and pressing both outwardly and oppositely. The sleeve D is also provided with two claws, clutches, or pawls, b b. These, however, are lighter, are made of sheet metal, and are pivoted to the sleeve, as clearly shown in the cross-section, Fig. 6, and in the views, Figs. 1 and 3, by semicircular extensions a a, these being loosely pivoted, so as to admit of free movement on a pivotal pin, c, passing through the pawl-extensions, (the ends of which overlap one another for that purpose,) and also through the shell of the sleeve D and through the hollow rod E. To allow the passage of the sleeve and to admit its being freely slid from one end to the other of the hollow rod, as also to prevent the sleeve from being detached from it, a long slot, n, is cut through the hollow rod E, and in it the pivot-pin c passes when the sleeve D moves over the hollow rod. A pair of leaf-springs, l l, are soldered by one end to the substance of the sleeve, and their free ends extend behind the semicircular pawls, as shown in Figs. 1, 2, 3, 6, and 7, and press the points of the said pawls outwardly. A cord, i, is firmly fastened to the pin c, to which the sleeve-pawls are pivoted, is passed through the length of the rod E, round the pulley k at the front end thereof, and back through the hollow rod E, issuing from the hindermost thereof, and extending any desired length.

In the operation of the device which is the subject of my invention the traveler is caused to make successive and progressive springs or leaps through a tube, and to haul after it a cord or wire, by which other wires, or, in fact anything which is desired, may be drawn through. Its manipulation, to that end, is as follows: The instrument, constructed as I have described with reference to the size of tube through which it is to pass, is inserted in the said tube, and immediately thereafter presents in section the appearance shown in Fig. 1. The cord i, extending from the rear end of the instrument, is now pulled, with the result as hereinafter described. Unopposed, the effect would be to pull the traveler from the tube; but the pivoted pawls or clutches d, attached to the head C, oppose such action, and having normally a tendency to extend outwardly, the first pull on the cord brings that tendency into operation, and causes the clutches to impinge upon the interior surface of the tube, and, if the said tube is of soft or comparatively soft material, even to dig into and penetrate the substance of its walls. This action is depicted in Fig. 2. The main body of the traveler is by this action prevented from responding to the impulse of the pulled cord i by withdrawing itself from the tube, and the necessary consequence is that, the tension on the cord i continuing, the sleeve to which its inner end is attached, after passing over the pulley k, is forced inward, being gradually drawn up against the constant force exerted by the spiral spring g, and such is the condition represented in Fig. 2, the pawls d being embedded in the walls of the tube A, the sleeve D drawn up to a point much nearer the head C than that at which it is normally maintained, and the helical spring g correspondingly compressed between the head C and the sleeve D. The pulling force on the cord i is now no longer applied. The spring g resumes by its own resiliency its normal position and length, and in doing so causes the entire instrument to fly forward, because, although the natural impulse of the spring, when compressed, is to expand in both directions, the hinder clamps or pawls b now come into play. They, being forced outwardly by the springs l, anchor the sleeve D in the advanced position to which it was brought by the force exerted to pull the cord, the points of the said pawls or claws b impinging upon and in some cases entering the substances of the internal surface of the tube to be explored. The pawls d of the head or front end, having nothing to oppose their forward motion, are released from their hold on the tube A, and the traveler is thus impelled forward by the expansion of the helical spring. The length of each leap is only limited by the length and elasticity of the spring g and the initial force exerted on the cord i. In the application of such a traveler to pipes or tubes of hard material I substitute for the sharp-pointed claws or clutches d d and b b claws with broad surfaces, milled or corrugated in a manner similar to the jaws of a vise.

It is obvious that my invention can be applied not only as a pioneer in the introduction of wires or cords into pipes in the manufacture of "lead-covered cables," so called, but is equally well adapted to thread wires through pipes in systems of underground electrical conductors, or to convey or thread any desired cord, wire, or cognate article through any system of tubing whatsoever. It is also evident that when one wire or cord is threaded through a tube any number of similar wires may be attached thereto and so hauled through, the great problem being to thread the initial wire or cord, which I accomplish by my invention with apparatus of the simplest and cheapest character.

I claim—

1. A threading-instrument consisting of a rod provided at its front end with detaining claws or pawls, a sleeve sliding thereon, also furnished with detaining-claws, a helical impelling-spring surrounding the rod and normally expanded between the head thereof and the movable sleeve, and means whereby the said spring may be compressed and adapted to urge forward the threading-instrument, substantially as and for the purposes described.

2. In a pipe-threading instrument, the combination of an impelling-spring, means, substantially as described, for compressing and energizing the said spring from a point in its rear, a tubular rod containing the said compressing devices, and surrounded by the impelling-spring, and retaining devices consisting of pivoted claws at each end of the impelling-spring, adapted to be pressed outwardly by flat springs, whereby the instrument is prevented from retrograding either during the compression or recoil of the impelling-spring, as specified.

3. The combination, in an instrument adapted for traveling through or threading tubes or pipes, of a hollow rod, an impelling-spring attached thereto, a sleeve sliding on the same rod, means, substantially as described, whereby a power or force externally located may advance the said sleeve and compress the impelling-spring, claws or clutches upon the main rod, adapted to prevent retrograde movement during the advance of the sleeve, and other claws or clutches on the sleeve adapted to anchor the same, whereby the spring is allowed to expand only in a forward direction.

4. The combination, with a tube or pipe designed for the reception of a wire or wires, of a threader therefor, consisting of an impelling-spring, a main stem or rod, a sleeve attached to said main stem and sliding thereon, a cord or its equivalent fixed to said sleeve, passing over a pulley attached to the said main rod and issuing from the rear of the rod, whereby the sleeve may be caused to compress the impelling-spring, and detaining-pawls on the said main stem and sleeve, whereby all retrograde movement is prevented, substantially as specified.

In testimony whereof I have signed my name to this specification, in the presence of two subscribing witnesses, this 16th day of November, 1882.

HENRY B. LYTLE.

Witnesses:
   J. H. CHEEVER,
   D. E. RICHARDS.